US011937078B2

(12) United States Patent
Cheon et al.

(10) Patent No.: US 11,937,078 B2
(45) Date of Patent: Mar. 19, 2024

(54) MOBILE DEVICE FOR DETECTING ROUTE OVERLAP AND METHODS THEREOF

(71) Applicant: CRYPTO LAB INC., Seoul (KR)

(72) Inventors: Jung Hee Cheon, Seoul (KR); Keewoo Lee, Seoul (KR); Sumin Kim, Seoul (KR); Jae Seon Kim, Seoul (KR)

(73) Assignee: CRYPTO LAB INC., Seoul (KR)

( * ) Notice: Subject to any disclaimer, the term of this patent is extended or adjusted under 35 U.S.C. 154(b) by 348 days.

(21) Appl. No.: 17/410,375

(22) Filed: Aug. 24, 2021

(65) Prior Publication Data
US 2022/0070665 A1    Mar. 3, 2022

(30) Foreign Application Priority Data

Aug. 25, 2020   (KR) .................. 10-2020-0107260
Aug. 20, 2021   (KR) .................. 10-2021-0110113

(51) Int. Cl.
*H04W 12/037*  (2021.01)
*H04L 9/00*     (2022.01)
*H04W 4/024*    (2018.01)
*H04W 4/029*    (2018.01)

(52) U.S. Cl.
CPC .......... *H04W 12/037* (2021.01); *H04L 9/008* (2013.01); *H04W 4/024* (2018.02); *H04W 4/029* (2018.02)

(58) Field of Classification Search
CPC ... H04W 12/037; H04W 4/024; H04W 4/029; H04L 9/008
See application file for complete search history.

(56) References Cited

U.S. PATENT DOCUMENTS

| | | | | |
|---|---|---|---|---|
| 8,213,617 B1 * | 7/2012 | Appleton | .............. | H04W 4/023 380/255 |
| 9,191,196 B2 * | 11/2015 | Raykova | ................. | H04L 9/008 |
| 10,796,006 B2 * | 10/2020 | Roake | .................. | G06F 21/602 |
| 10,878,108 B1 * | 12/2020 | Nicolas | ................. | G06F 21/602 |
| 11,050,725 B2 * | 6/2021 | Becher | .................... | H04L 9/085 |

(Continued)

OTHER PUBLICATIONS

Notice of Preliminary Rejection issued for Korean Patent Application No. 10-2021-0110113 filed on Aug. 20, 2021 on behalf of Crypto Lab et al, dated Mar. 21, 2023. KR Original + English Translation. 14 pages.

(Continued)

*Primary Examiner* — Techane Gergiso
(74) *Attorney, Agent, or Firm* — Steinfl + Bruno LLP

(57) ABSTRACT

A mobile device is disclosed. The device includes a communicator, a GPS unit for calculating location information, a memory, a display, and a processor, and the processor is configured to generate movement path information of the mobile device by performing homomorphic encryption of a plurality of pieces of location information stored in the memory, transmit the movement path information to a server apparatus through the communicator, based on operation result data obtained by operating based on the movement path information and comparison target path information being transmitted from the server apparatus, decrypt the operation result data, and output a message notifying whether a route overlaps the comparison target path information based on a decrypted result through the display. Therefore, the route overlap is rapidly and accurately confirmed without invasion of privacy.

10 Claims, 7 Drawing Sheets

(56) References Cited

U.S. PATENT DOCUMENTS

| | | | | |
|---|---|---|---|---|
| 11,750,365 | B2* | 9/2023 | Yoo | G06F 21/6245 |
| | | | | 713/189 |
| 2013/0173787 | A1* | 7/2013 | Tateishi | H04L 9/008 |
| | | | | 709/224 |
| 2017/0053282 | A1* | 2/2017 | Olumofin | G06Q 20/3224 |
| 2017/0170960 | A1* | 6/2017 | Shaked | H04L 63/0442 |
| 2018/0198601 | A1* | 7/2018 | Laine | H04L 9/3239 |
| 2019/0342270 | A1* | 11/2019 | Laine | G06F 21/602 |
| 2019/0385711 | A1* | 12/2019 | Shriberg | G16H 10/20 |
| 2020/0082113 | A1* | 3/2020 | Van Liesdonk | G06Q 10/087 |
| 2021/0099308 | A1* | 4/2021 | Abbas | H04L 9/3242 |
| 2021/0119792 | A1* | 4/2021 | Bastable | H04N 21/4405 |
| 2021/0243595 | A1* | 8/2021 | Buck | H04W 12/088 |
| 2021/0399873 | A1* | 12/2021 | Duchin | H04L 9/006 |
| 2021/0409189 | A1* | 12/2021 | Yoo | G06F 21/6218 |
| 2022/0004654 | A1* | 1/2022 | Patel | G06F 21/602 |

OTHER PUBLICATIONS

Rajan, M. A., et al., "A Note on Cryptographic Algorithms for Private Data Analysis in Contact Tracing Applications", arXiv:2005.10634v1 [cs.CR] TCS Research, India. May 19, 2020. 12 pages.

Singh, P., et al., "PPContactTracing: A Privacy-Preserving Contact Tracing Protocol for Covid-19 Pandemic", Dhirubhai Ambani Institute of Information and Communication Technology, arXiv:2008.06648v1 [cs.CR] Aug. 15, 2020. 6 pages.

Altuwaiyan T. et al., "EPIC: Efficient Privacy-preserving Contact Tracing for Infection Detection" *IEEE Xplore*, 2018, 6 pages.

Notice of Preliminary Rejection issued for Korean Patent Application No. 10-2021-0110113 filed Aug. 20, 2021 on behalf of Crypto Lab et al. dated Sep. 25, 2023. KR Original + English Translation. 14 pages.

* cited by examiner

MOBILE DEVICE FOR DETECTING ROUTE OVERLAP AND METHODS THEREOF

BACKGROUND

1. Field

The disclosure relates to a mobile device for detecting route overlap and a method thereof.

2. Description of the Related Art

Currently, infectious disease such as COVID-19 is being spread rapidly. Such an infectious disease may spread to a lot of people in the same space at the same time, and accordingly, if one thinks that he/she might be infected, it is necessary to perform a test rapidly to prevent further spread.

The possibility of infection may be predicted by confirming whether one is in the same space at the same time with an infected patient. Thus, it is necessary to detect overlap of a movement route for each time. In this aspect, in the related art, the movement route of the infected patient for each time was noticed in detail in messages or homepages in local associations or infection prevention centers to advice people with the overlapped route to voluntarily get a test. In this case, the privacy of the infected patient may be significantly invaded and people may avoid visiting various stores included in the movement route, thereby causing a problem of unintended damage of the stores. If the movement route is shown ambiguously due to this problem, people may not easily recognize the risk of infection, and particularly, in a case of people who are not heavily concerning the risk of infection, they may continue to move around without knowing that they are infected, which may increase the risk of further spread.

Therefore, it is necessary to provide a method for accurately and rapidly notifying the risk of infection without invasion of privacy and unnecessary damages.

SUMMARY

The disclosure is made in view of the above needs and an object of the disclosure is to provide a device and a method for accurately detecting overlap with a movement route of others without invading privacy.

According to an embodiment of the disclosure to achieve the above object, there is provided a mobile device including a communicator, a GPS unit for calculating location information, a memory, a display, and a processor configured to obtain a plurality of pieces of GPS location information according to a location change of the mobile device from the GPS unit and store the plurality of pieces of location information in the memory.

The processor is configured to generate movement path information of the mobile device by performing homomorphic encryption of the plurality of pieces of GPS location information, and transmit the movement path information to a server apparatus through the communicator, based on operation result data obtained by operating based on the movement path information and comparison target path information being transmitted from the server apparatus, decrypt the operation result data, and output a message notifying whether a route overlaps the comparison target path information based on a decrypted result through the display.

The processor is configured to calculate a vector value by encoding the plurality of pieces of GPS location information stored in the memory to each element in a plaintext space of a homomorphic ciphertext, and perform homomorphic encryption on the calculated vector value to generate the encrypted movement path information.

The operation result data is expressed as ctxt:=(Enc($\vec{a}$)−$\vec{b}$)⊙$\vec{r}$. Here, $\vec{r}$ represents a random vector, $\vec{b}$ represents the vector value obtained by encoding the comparison target path information, and Enc($\vec{a}$) represents the movement path information subjected to the homomorphic encryption.

The processor is configured to obtain $\vec{ptxt}$ by decrypting the ctxt, based on an i-th element of the $\vec{ptxt}$ being 0, detect that the route overlaps at a point where it is located at time and based on all elements being not 0, detect that the route does not overlap.

The processor is configured to encode the plurality of pieces of GPS location information stored in the memory to each element in a plaintext space of a homomorphic ciphertext, calculate a polynomial configured with each encoded element, and perform homomorphic encryption on the calculated polynomial $f_A(x)$ to generate the movement path information.

The polynomial $f_A(x)$ is expressed as $$f_A(x) = \prod_{i=1}^{n}(x - a_i) \in Z_p[x].$$

Here, x represents a variable, $Z_p[x]$ represents the plaintext space, and $a_i$ represents an i-th element in the plaintext space.

The operation result data may be expressed as $Enc(r_A(x) \cdot f_A(x) + r_B(x) \cdot f_B(x))$. Here, $r_A(x)$ and $r_B(x)$ represent random polynomials, and $f_B(x)$ represents a polynomial obtained by encoding the comparison target path information.

The processor is configured to obtain $g(x)=r_A(x) \cdot f_A(x)+r_B(x) \cdot f_B(x)$ by decrypting the operation result data, calculate a greatest common denominator of the operation result data and the $f_A(x)$, based on the greatest common denominator being $$\prod_{i=1}^{n}(x - b_i),$$

detect that the route overlaps at a point where it is located at time $t_i$ that $b_i$ is decrypted, based on the greatest common denominator being 1, detect that the route does not overlap.

According to another aspect of the disclosure, there is provided a route overlap detecting method of a mobile device, the method including calculating and storing GPS location information, performing homomorphic encryption on a plurality of pieces stored GPS location information and generating movement path information of the mobile device, transmitting the movement path information to a server apparatus, based on operation result data obtained by operating based on the movement path information and comparison target path information being received from the server apparatus, decrypting the operation result data, and outputting a message notifying whether a route overlaps the comparison target path information based on a decrypted result.

The generating the movement path information includes calculating a vector value by encoding the plurality of pieces of GPS location information to each element in a plaintext space of a homomorphic ciphertext, and performing homomorphic encryption on the calculated vector value to generate the movement path information.

The operation result data is expressed as ctxt:=(Enc($\vec{a}$)−$\vec{b}$)⊙$\vec{r}$, here, $\vec{r}$ represents a random vector, $\vec{b}$ represents the vector value obtained by encoding the comparison target path information, and Enc($\vec{a}$) represents the movement path information subjected to the homomorphic encryption.

The outputting the message may include, obtaining $\vec{ptxt}$ by decrypting the ctxt, based on an i-th element of the obtained $\vec{ptxt}$ being 0, detecting that the route overlaps at a point where it is located at time $t_i$, and based on all elements being not 0, detecting that the route does not overlap, and generating and outputting a message corresponding to a detection result.

The generating the movement path information includes encoding the plurality of pieces of GPS location information to each element in a plaintext space of a homomorphic ciphertext, calculating a polynomial configured with each encoded element, and performing homomorphic encryption on the calculated polynomial $f_A(x)$ to generate the movement path information.

The polynomial $f_A(x)$ is $$f_A(x) = \prod_{i=1}^{n}(x - a_i) \in Z_p[x],$$

and here, x represents a variable, $Z_p[x]$ represents the plaintext space, and $a_i$ represents an i-th element in the plaintext space.

The operation result data may be $Enc(r_A(x) \cdot f_A(x) + r_B(x) \cdot f_B(x))$. here, $r_A(x)$ and $r_B(x)$ represent random polynomials, and $f_B(x)$ represents a polynomial obtained by encoding the comparison target path information.

The outputting the message may include calculating a greatest common denominator of $g(x)=r_A(x) \cdot f_A(x)+r_B(x) \cdot f_B(x)$ obtained by decrypting the operation result data and the $f_A(x)$, based on the greatest common denominator being $$\prod_{i=1}^{n}(x - b_i),$$

detecting that the route overlaps at a point where it is located at time $t_i$ that $b_i$ is decrypted, and based on the greatest common denominator being 1, detecting that the route does not overlap, and generating and outputting a message corresponding to a detection result.

According to still another aspect of the disclosure, there is provided a server apparatus including a communicator, a memory, and a processor, in which the processor is configured to, based on comparison target path information corresponding to a movement path of a patient being received through the communicator, store the comparison target path information in the memory, and based on movement path information subjected to homomorphic encryption being received from a mobile device through the communicator, subtract the movement path information subjected to homomorphic encryption from the comparison target information, multiply random data by the subtraction result to calculate operation result data, and transmit the operation result data to the mobile device through the communicator.

According to still another aspect of the disclosure, there is provided a recording medium storing a program code for performing a route overlap detecting method of a terminal apparatus. The route overlap detecting method includes calculating and storing GPS location information of the mobile device, performing homomorphic encryption on a plurality of pieces stored GPS location information and generating movement path information of the mobile device, transmitting the movement path information to a server apparatus, based on operation result data obtained by operating based on the movement path information and comparison target path information being received from the server apparatus, decrypting the operation result data, and outputting a message notifying whether a route overlaps the comparison target path information based on a decrypted result.

According to the various aspects of the disclosure, it is possible to accurately detect whether a movement route of oneself overlaps movement path of others without invading privacy. If the movement path of patient infected with infection disease or virus is secured, it is possible to rapidly and accurately detect the overlap with the movement path of the patient to rapidly deal with it while minimizing invasion of privacy and other damages.

DETAILED DESCRIPTION

Figure 1:
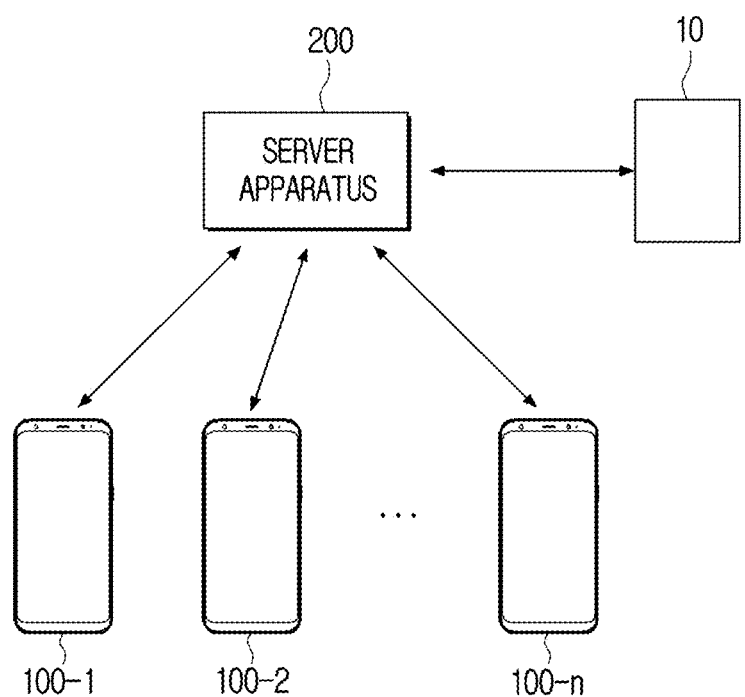
FIG. 1 is a diagram illustrating operations of a system according to an embodiment.

Hereinafter, the disclosure will be described in detail with reference to the accompanying drawings. In an information (data) transmission process performed in the disclosure, encryption/decryption may be applied if necessary, and the expression describing the information (data) transmission process in the disclosure and claims should be interpreted to include a case of encrypting/decrypting, although it is not mentioned. In the disclosure, the expression in a form of "transmitting (transferring) from A to B" or "receiving A from B" may include transmitting (transferring) or receiving with another medium therebetween and does not express only the direct transmitting (transferring) or receiving from A to B.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps. In the specification, "A or B" does not only selectively indicate any one of A and B, but is defined to include both A and B. In addition, a term "including" in the disclosure may have meaning of further including other elements, in addition to the listed elements.

A term such as "module" or "unit" in the disclosure is general-use hardware or software performing the function thereof, or may be a logical combination of hardware and software.

In the specification, compulsory elements necessary for the description of the disclosure are only described and elements with no relation with the gist of the disclosure may not be mentioned. It should not be interpreted as exclusive meaning of including only the mentioned elements, but should be interpreted as non-exclusive meaning of including other elements.

The disclosure may be performed by an electronic operation device such as a computer, a server, or a mobile device such as a smartphone capable of performing electronic operation, and the mathematical operation and calculation of each step of the disclosure which will be described below may be implemented as other operation in execution of a computer program by a coding method well known for the corresponding operation or calculation and/or coding conceived suitably to the disclosure. The computer program executing the disclosure may be stored in a computer-readable recording medium.

A "value" in this disclosure is not only a scalar value but may also be defined as broad concept containing all values that may be expressed as vectors, matrices, mathematical expressions such as polynomials.

The expression of obtaining a predetermined value by performing operations such as encryption or hashing for a specific value in the disclosure may be defined to containing operations such as encryption or hashing for, not only the corresponding specific value, but also a modification of the corresponding specific value (e.g., another value calculated through a process of performing additional calculation of a predetermined value with respect to the specific value or changing the corresponding specific value according to a predetermined rule).

The mathematical operation and calculation of each step of the disclosure which will be described below may be implemented by computer operation by a coding method well known for the corresponding operation or calculation and/or coding conceived suitably to the disclosure.

To Each constituent element of the device illustrated in the accompanying drawings of the disclosure, any shapes, sizes, and dimensions capable of performing the functions intended in the disclosure may be applied, in addition to shapes, sizes, and dimensions clearly illustrated in the drawings.

The specific mathematical expressions described below are described as examples from many possible alternatives, and it should not be interpreted that the scope of a right of the disclosure is not limited to the mathematical expressions in the disclosure.

For convenience of description, the followings are defined in the disclosure.

$a \leftarrow D$: An element a is selected according to a distribution D.

$s1, s2 \in R$: Each of S1 and S2 is an element belonging to R group.

$\mathrm{mod}(q)$: The modular operation with an element q.

$\lfloor \cdot \rfloor$: Rounding off inner value.

In addition, symbols mathematic expressions not described in the disclosure may be understood as generally known in the mathematic fields.

Hereinafter, various embodiments of the disclosure will be described in detail with reference to the accompanying drawings.

FIG. 1 is a diagram illustrating operations of a system according to an embodiment. Referring to FIG. 1, the system may include a server apparatus 200, a plurality of mobile devices 100-1 to 100-$n$, and a terminal apparatus 10.

The terminal apparatus 10 may refer to an apparatus that provides a movement route of a user who is an object of interest. The user who is the object of interest may refer to a target to compare the route. In an example, the user may be a COVID-19 patient but is not limited thereto, and may be applied in various environments. For example, the route may be based on routes of various persons such as a patient with other infectious diseases, a sex offender, a stalker, a person charged with the restraining order, and the like. For convenience of description, in the disclosure, the movement route of such object of interest may refer to a comparison target route.

The terminal apparatus 10 may be an apparatus for registering the comparison target route on the server apparatus 200. Specifically, the terminal apparatus may be implemented as a server apparatus, a terminal apparatus, and a kiosk provided in a police station, a community health center, a disease prevention center, a hospital, a court, and other government offices, may also be implemented as a mobile device such as a mobile phone or a tablet owned by a manager who manages such jobs, or may also be a mobile device directly owned by a person who is the object of interest.

The plurality of mobile devices 100-1 to 100-$n$ may refer to mobile devices such as mobile phones or tablets owned by users who uses a route overlap notification service.

Each of the mobile devices 100-1 to 100-$n$ may perform homomorphic encryption on movement path information of its own and provide the movement path information subjected to the homomorphic encryption to the server apparatus 200. The movement path information may refer to information including location of the mobile device at each time. The location information may be configured with lines of longitude and latitude but is not limited thereto, and may also be implemented as address information of administrative district. The homomorphic encryption may be an encryption method capable of operating the data in an encrypted state. A result of operation using ciphertexts is a new ciphertext, and a plaintext obtained by decrypting this may be the same as the operation result of the original data before the encryption.

The server apparatus 200 may perform a predetermined operation by using homomorphic ciphertexts provided from each of the mobile devices 100-1 to 100-$n$, that is, a movement path information and a comparison target route information, and provide the operation result data to each of the mobile devices 100-1 to 100-$n$ again. The movement path information is provided to the server apparatus 200 in the homomorphic encryption state, and accordingly, there is no risk of leakage of the route of the user of each of the mobile devices 100-1 to 100-$n$ by the server apparatus 200, thereby preventing invasion of privacy of the user. In addition, the comparison target route information itself may not be provided to each of the mobile devices 100-1 to 100-$n$, thereby preventing invasion of privacy of the user.

When the operation result data operated in a state where the security is maintained as described above is transmitted, each of the mobile devices 100-1 to 100-n may decrypt the received operation result data and determine the route overlap with the comparison target route information based on the decrypted result. If it is determined that the routes overlap, each of the mobile devices 100-1 to 100-n may notify user in various methods.

Figure 2:
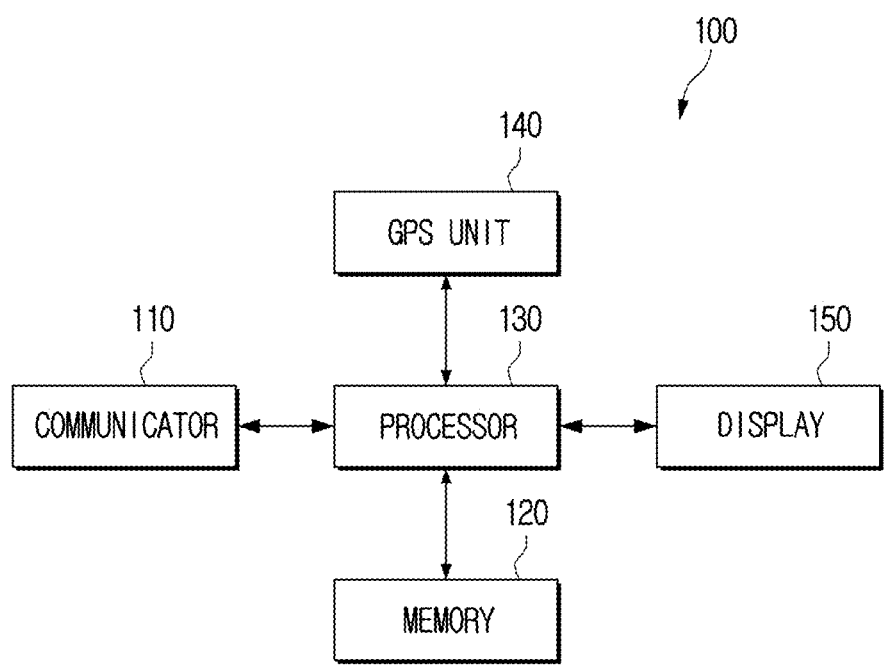
FIG. 2 is a block diagram illustrating a configuration of a mobile device according to an embodiment.

FIG. 2 is a block diagram illustrating a configuration of a mobile device according to an embodiment. The mobile device 100 of FIG. 2 is one device suitable to describe the embodiment of the disclosure among the plurality of mobile devices 100-1 to 100-n of FIG. 1, and the configuration of FIG. 2 may be variously added or changed according to the type of the mobile device.

Referring to FIG. 2, the mobile device 100 may include a communicator 110, a memory 120, a processor 130, a GPS unit 140, and a display 150.

The communicator 110 may be a configuration for communicating with an external apparatus. The communicator 110 may be implemented in a form of including at least one of wireless communication modules performing communication according to various wireless communication standards such as a Wi-Fi module, a Bluetooth module, an infrared communication module, Zigbee, 3rd Generation (3G), 3rd Generation Partnership Project (3GPP), Long Term Evolution (LTE), LTE Advanced (LTE-A), 4th Generation (4G), 5th Generation (5G), or input and output interfaces such as High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI), but is not limited thereto, and various types of communication method may be used. The communicator 110 may be referred to as a communication interface or a transceiver but will be referred to as the communicator in this disclosure.

The communicator 110 may provide various signals and data received from the external apparatus to the processor 130 and various signals and data may be transmitted to various external apparatuses according to the control of the processor 130. In an example, the communicator 110 may provide the movement path information to the server 200 according to the control of the processor 130 and receive the operation result data from the server apparatus 200.

The memory 120 may be a constituent element for storing various programs, data, and instructions necessary for the operations of the mobile device 100. FIG. 2 illustrates one memory 120 separate from the processor 130, but a number, a type, a location of the memory may be variously implemented according to an embodiment. Specifically, the memory 120 may be implemented in various forms such as a RAM, a ROM, a buffer, a cache, a flash memory, an HDD, an external memory, or a memory card, and is not limited to any one thereof.

The memory 120 may store various pieces of information such as location information of the mobile device 100 at each time, movement path information configured with a plurality of pieces of location information, movement path information subjected to homomorphic encryption, and the like. In addition, the memory 120 may store a public key and a secret key necessary for homomorphic encryption and decryption, and if the mobile device 100 generate such keys directly, the memory 120 may store various parameters necessary to generate the keys. In addition, the memory 120 may store operation result data received from the server apparatus 200 through the communicator 110.

The GPS unit (global position system sensor) 140 may be a configuration for calculating GPS location information. The GPS unit 140 may receive a plurality of GPS signals and obtain current location information of the mobile device 100. The current location information may be directly calculated by the GPS unit 140 and may be calculated by the processor 130 based on the GPS signal provided from the GPS unit 140. Meanwhile, according to an embodiment, the GPS unit 140 may be omitted, or a situation where the GPS signal is not able to be received by the GPS unit 140 may occur. In such a case, the processor 130 may predict the location of the mobile device 100 based on the location of a Wi-Fi router connected to the communicator 110 or communication base station.

The display 150 may be a configuration for displaying various screens. The display 150 may be implemented in various forms such as a liquid crystal display (LCD), an organic light-emitting diode (OLED), Liquid Crystal on Silicon (LCoS), Digital Light Processing (DLP), a quantum dot (QD). The display 150 may display various messages or screens according to the control of the processor 130.

The processor 130 may control general operations of the mobile device 100. For example, the processor 130 may perform a route overlap detection operation and a notification operation according to the embodiment of the disclosure by executing at least one instruction stored in the memory 120. The processor 130 may be configured with a single device such as a central processing unit (CPU) or an application-specific integrated circuit (ASIC) and may also be configured with a plurality of configurations such as a CPU and a graphics processing unit (GPU).

The processor 130 may store location information obtained from the GPS unit 140 and other configurations in the memory 120. The processor 130 may store the location information in a predetermined time cycle unit or may store the location information changed each time when the location change is detected. Accordingly, the memory 120 may store a plurality of pieces of location information according to the location change.

If a specific event occurs, the processor 130 may generate the movement path information of the mobile device by performing homomorphic encryption of the plurality of pieces of location information stored in the memory 120. The movement path information herein may refer to the homomorphic encryption. The processor 130 may transmit the generated movement path information to the server apparatus 200 through the communicator 110. The event for transmitting the movement path information may be variously set. In an example, if an event in which a specific application installed in the memory 120 is executed or an event in which a menu for checking the route overlap is selected on an execution screen of the application occurs, the processor 130 may transmit the movement path information subjected to the homomorphic encryption to the server apparatus 200. In another example, the event may be an event in which a predetermined time cycle arrives, an event in which the mobile device 100 is turned on or rebooted, and the like, and the route overlap determination function may be performed regarding at least two or more events among such events.

When the movement path information is received from the mobile device 100, the server apparatus 200 may operate the movement path information with the comparison target path information and provide the operation result data. Since it is the movement path information in the homomorphic ciphertext state, the server apparatus 200 may perform the operation in a state where the movement path information of the mobile device 100 is not decrypted.

When the operation result data is received through the communicator 110, the processor 130 may decrypt the operation result data. Even if the operation is performed in the encrypted state due to the characteristic of the homomorphic ciphertext, the operation result may reflect on the plaintext as it is. Accordingly, the decrypted operation result data may be the result obtained by directly operating the actual movement path information of the mobile device and the comparison target information. The processor 130 may detect the route overlap with the comparison target path information based on the decrypted result.

The processor 130 may perform the operation according to the detection result. In an example, the processor 130 may output a message notifying the route overlap through the display 150. In another example, the processor may output a voice message through a speaker (not illustrated) provided in the mobile device 100. In still another example, as a result of the route overlap detection, if it is determined that the routes overlap, this may be immediately notified to an external server. If the external server is a server operating in organizations such as a community health center, emergency medical service center, a hospital, a disease prevention center, and the like, the organization that confirms the route overlap may immediately confirm the corresponding user as a suspected target of infection and take appropriate actions.

Figure 3:
FIG. 3 is a diagram illustrating an example of a message provided by the mobile device according to an embodiment.

FIG. 3 illustrates an example of a message displayed on a mobile phone, if the mobile device 100 is implemented as a mobile phone. Referring to FIG. 3, the processor 130 may generate a message 151 notifying when and where the routes overlap based on the location information of the mobile device 100 at each time and the route overlap detection result, and display the message through the display 150. FIG. 3 illustrates the message 151 in a text form, but the message may also be implemented in a form of displaying the movement path information on a map and displaying the overlap with the comparison target route at some locations on the movement path information.

Meanwhile, the location information may be displayed as coordinate information such as lines of longitude and latitude. It is difficult that the routes completely overlap on the locations, and accordingly, a case of including the location information in a certain range may be detected as overlap. In other words, according to an embodiment of the disclosure, the location information may be rounded based on a plurality of grids dispersed at regular intervals.

Figure 4:
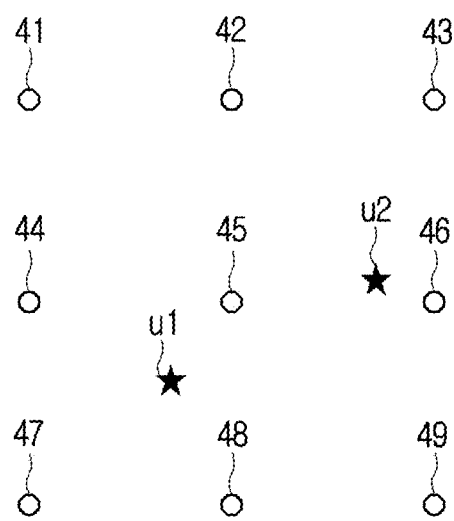
FIG. 4 is a diagram illustrating a method for detecting location overlap based on a plurality of grids.

FIG. 4 is a diagram illustrating a method for encoding the location information according to an embodiment of the disclosure. Specifically, FIG. 4 illustrates a method for detecting location overlap based on a plurality of grids 41 to 49. Each grid of FIG. 4 may be set as an intersection of lines of longitude and latitude, but is not limited thereto and may be set based on various references. FIG. 4 illustrates only nine grids, but a number and interval of the grids may be variously changed.

When a location of a first user is defined as u1 and a location of a second user is defined as u2, the location of each user may be mapped at a location of the closest grid. Accordingly, if the location overlap is detected in one grid unit, the location of u1 may be mapped with the grid 45 and the location of u2 may be mapped with the grid 46. Thus, it is detected that the two locations do not overlap. On the other hand, if the location overlap is detected in four grid unit, the location of u1 may be mapped as an area containing the grids 44, 45, 47, and 48 and the location of u2 may be mapped as an area containing the grids 42, 43, 45, and 46. Thus, the grid 45 where the two areas overlap may be detected as the overlap route. Such mapping may refer to encoding in this disclosure. According to an embodiment, each location information may be encoded by various methods to configure the movement path information.

In an example, the processor 130 may calculate a vector value $\vec{a}=(a_1, \ldots, a_n)$ by encoding the plurality of pieces of location information stored in the memory 120 as each element of a plaintext space of the homomorphic ciphertext.

Here, $a_i$ refers to an i-th element in a plaintext space Zn.

Location information $l_1, l_2, \ldots,$ and $l_n$ may be GPS information location recorded at different times $t_1, t_2,$ and $t_n$.

The processor 130 may perform the homomorphic encryption on the encoded vector value and generate movement path information. $\text{Enc}(\vec{a})$ in a form of the homomorphic cipher text.

The processor 130 may provide the generated movement path information $\text{Enc}(\vec{a})$ to the server apparatus 200. In response to this, the server apparatus 200 may transmit the operation result data obtained by operating the comparison target path information and the movement path information.

The operation result data may be expressed as the following mathematical expressions.

$$ctxt:=(\text{Enc}(\vec{a})-\vec{b})\odot \vec{r} \quad \text{<Mathematical Expression 1>}$$

Here, $\vec{r}$ represents a random vector, $\vec{b}$ represents a vector value obtained by encoding the comparison target path information, and $\text{Enc}(\vec{a})$ represents movement path information subjected to the homomorphic encryption.

In the mathematical expression, the comparison target path information is used in the operation in unencrypted state, but the comparison target path information may also be used in the operation in the homomorphic ciphertext form. Accordingly, operation result data ctxt may be expressed as the following mathematic expression.

$$\text{Enc}(\vec{r}\odot(\vec{a}-\vec{b})) \quad \text{<Mathematical Expression 2>}$$

In the mathematical expressions 1 and 2, $\odot$ represents multiplication of each element. It is found that the operation result data ctxt is still in the ciphertext form.

The processor 130 may decrypt the transmitted operation result data. When the decrypted result is defined as $\vec{ptxt}$, the processor 130 may confirm a value of each element of $\vec{ptxt}$ and detect the route overlap. In a case of the operation is performed as in the mathematical expressions 1 and 2, a subtraction operation between the movement path information and the comparison target path information is performed, and accordingly, the value thereof becomes 0 in the overlapped element. Accordingly, if the i-th element is 0, the processor 130 may detect the route overlaps at a point where it is located at time L. Meanwhile, if all elements are not 0, the processor 130 may detect that the entire routes do not overlap.

In another example, the movement path information and the comparison target path information may be configured as polynomial. Specifically, the processor 130 may encode the plurality of pieces of location information stored in the memory 120 to each element in the plaintext space of the homomorphic ciphertext, and calculate the polynomial configured with each encoded element. The polynomial may be expressed as the following mathematical expression.

$$f_A(x) = \prod_{i=1}^{n}(x - a_i) \in Z_p[x] \quad \text{⟨Mathematical Expression 3⟩}$$

In the mathematical expression 1, x represents a variable, $Z_p[x]$ represents a plaintext space, and $a_i$ represents an i-th element in the plaintext space.

The processor 130 may perform the homomorphic encryption of the calculated polynomial, generate the movement path information subjected to the homomorphic encryption, and transmit this to the server apparatus 200 through the communicator 110. In this case, the server apparatus 200 may provide the operation result data expressed in a form of the following mathematic expression.

$$\text{Enc}(r_A(x) \cdot f_A(x) + r_B(x) \cdot f_B(x)) \qquad \text{<Mathematical Expression 4>}$$

$r_A(x)$ and $r_B(x)$ represent random polynomials, and $f_B(x)$ represents a polynomial obtained by encoding the comparison target path information.

The processor 130 may decrypt the operation result data received through the communicator 110 and confirm the operation result. The operation result may be expressed as below.

$$g(x) = r_A(x) \cdot f_A(x) + r_B(x) \cdot f_B(x) \qquad \text{<Mathematical Expression 5>}$$

The processor 130 may calculate the greatest common denominator $\gcd(f_A(x), g(x))$ of the obtained operation result $g(x)$ and $f_A(x)$.

The processor 130 may detect the route overlap according to the greatest common denominator. In other words, if the greatest common denominator is $$\prod_{i=1}^{n}(x - b_i),$$

the processor 130 may detect that the route overlaps at the point $a_i$ at time $t_i$ that $b_i$ is decrypted. On the other hand, if the greatest common denominator is 1, the processor 130 may detect that the entire routes do not overlap.

As described above, by using the movement path information subjected to the homomorphic encryption, it is possible to confirm whether the routes overlap rapidly and accurately even in a state where the security is maintained. The homomorphic encryption may be performed according to one of various schemes. In an example, the processor 130 may perform the homomorphic encryption by using Brakerski/Fan-Vercauteren (B/FV) homomorphic encryption scheme. In addition, the secret key and the public key necessary for the homomorphic encryption may be generated directly by the processor 130 and stored in the memory 120 or may be provided from the external apparatus and used. In a case of generating the keys autonomously, the processor 130 may generate the public keys by using the Ring-LWE technology but there is no limitation thereto.

Figure 5:
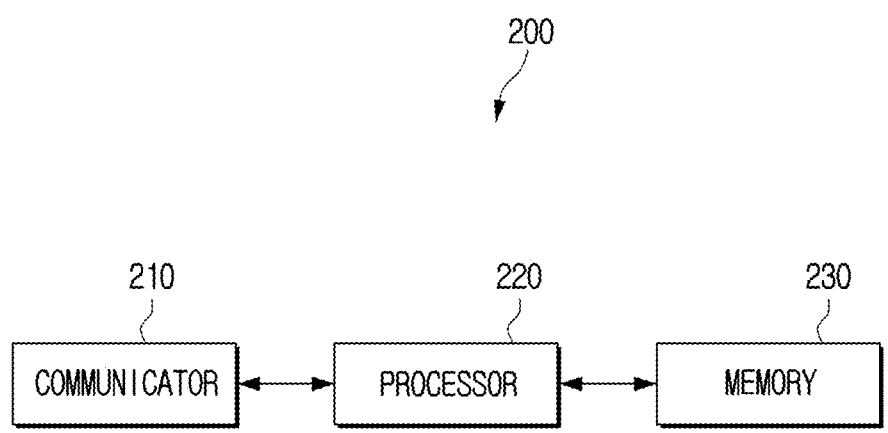
FIG. 5 is a block diagram illustrating a configuration of a server apparatus according to an embodiment.

FIG. 5 is a block diagram illustrating a configuration of a server apparatus according to an embodiment. Referring to FIG. 5, the server apparatus 200 may include a communicator 210, a processor 220, and a memory 230. The server apparatus 200 may be implemented as various types of apparatuses, and may be implemented as various examples of the communicator 210, the processor 220, and the memory 230, but this has been described specifically with reference to FIGS. 1 and 2, and therefore the overlapped description will not be repeated.

The communicator 210 may be a configuration for communicating with at least one or more mobile devices and the terminal apparatus. The communicator 210 may receive the comparison target path information from the external apparatus. Specifically, the comparison target path information may be directly received from the terminal apparatus owned by the object of interest or received from server apparatuses of various organizations. In addition, the comparison target path information itself may be received in a form of the homomorphic ciphertext as described above, but in the embodiment, a case where the server apparatus 200 directly performs the encryption will be described as an example. Further, the communicator 210 may receive the movement path information subjected to the homomorphic encryption from the at least one or more mobile devices.

The memory 230 may be a configuration for storing the comparison target path information.

When the comparison target path information itself is received, the processor 220 may encode each location information included in the comparison target path information. In the embodiment of operating in a form of vector as described above, the encoded comparison target path information may be expressed as $\vec{b}$.

In addition, the processor 220 may calculate the random vector $\vec{r} = (r_1, \ldots, r_n)$ by arbitrarily selecting an element $r_i$ of the plaintext space which is not 0. The processor 220 may perform the operation by using the movement path information, the comparison target path information, and the random vector and generate the operation result data. The operation result data may be expressed as in the mathematical expression 1 or 2 but is not limited thereto. The processor 220 may provide the generated operation result data to the mobile device through the communicator 210.

Meanwhile, in the embodiment of operating in a form of polynomial as described above, the processor 220 may encode each location information of the comparison target path information to each element of the plaintext space of the homomorphic ciphertext to generate $f_B(x)$.

In addition, the processor 220 may randomly generate predetermined degrees of random polynomials $r_A(x)$ and $r_B(x)$. Here, the degree d of the random polynomial and the number of element n of $f_B(x)$ may be set so that a value of n+d is equal to or less than the dimension N of the ring of the homomorphic ciphertext used.

When the movement path information subjected to the homomorphic encryption is received from the mobile device, the operation is performed together with the comparison target path information stored in the memory 230. The operation is configured to include the subtraction operation between the movement path information and the comparison target path information, but is not limited thereto, and the operation in other forms may be performed.

As described above, when the random data such as the random vector or the random polynomial is generated and reflected on the operation, the entire comparison target path information may not be restored, although the decryption is performed on the mobile device.

Figure 6:
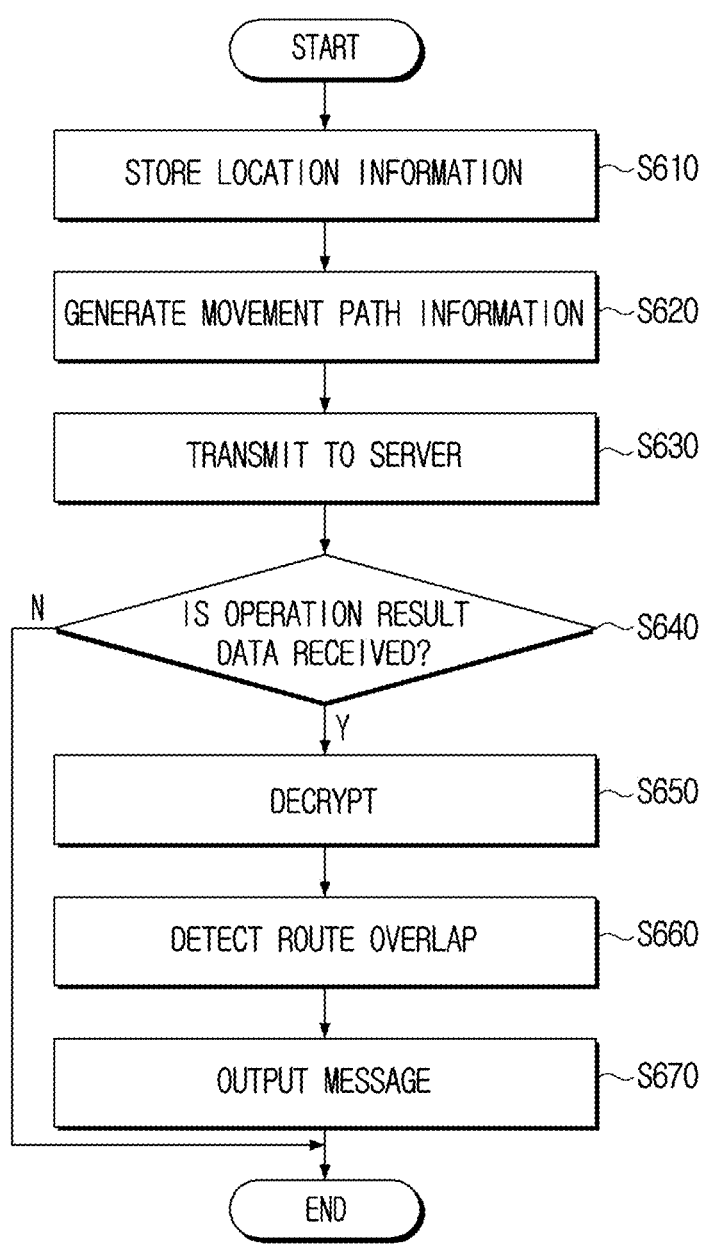
FIG. 6 is a flowchart illustrating a route overlap detecting method according to an embodiment.

FIG. 6 is a flowchart illustrating a route overlap detecting method according to an embodiment. Referring to FIG. 6, the mobile device may periodically store the location information (S610) and generate the movement path information subjected to the homomorphic encryption based on this (S620). The mobile device may transmit the generated movement path information to the server apparatus (S630). The movement path information generating method has been described above, and therefore the overlapped description will not be repeated.

Hereinafter, when the operation result data is received from the server apparatus (S640), the mobile device may decrypt the operation result data (S650) and detect the route overlap based on this result (S660). The form of the operation result data and the route overlap detecting method have been specifically described above, and therefore the overlapped description will not be repeated.

The mobile device may output a message according to the detection result (S670).

Figure 7:
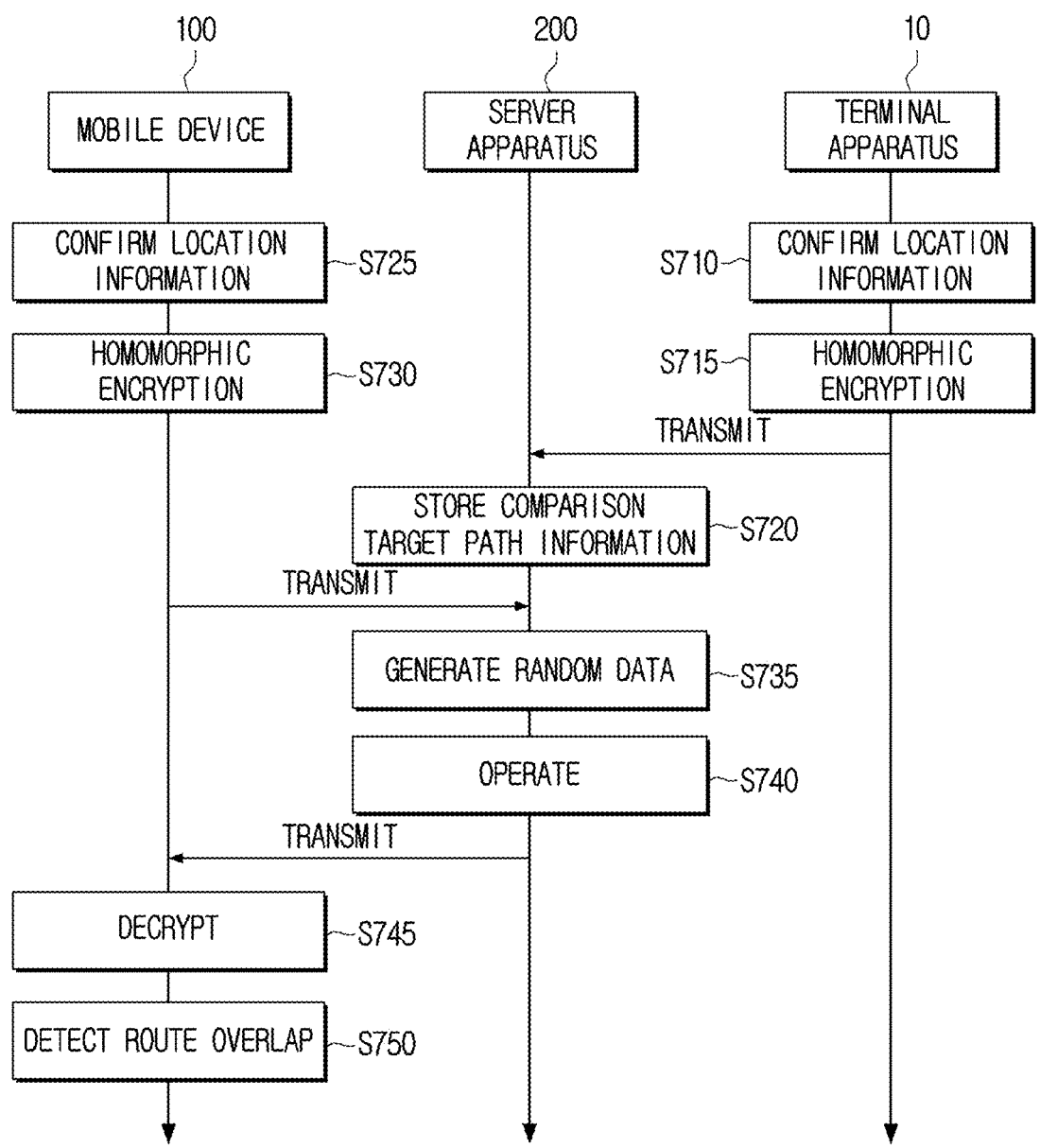
FIG. 7 is a timing diagram illustrating the route overlap detecting method in the system according to an embodiment.

FIG. 7 is a timing diagram illustrating the route overlap detecting method in the system according to an embodiment. Referring to FIG. 7, the system may include the mobile device 100, the server apparatus 200, the terminal apparatus 10.

The terminal apparatus 10 may be a mobile device owned by the object of interest or an apparatus which receives the location information of the object of interest. Accordingly, the location information of the terminal apparatus 10 may be used as the comparison target path information described in the above embodiments.

The terminal apparatus 10 may confirm the location information, perform the homomorphic encryption, generate the comparison target path information, and transmit the comparison target path information to the server apparatus 200 (S710, S715). The server apparatus 200 may store the comparison target path information (S720).

Meanwhile, the mobile device 100 may also confirm the location information, perform the homomorphic encryption, generate the movement path information, and transmit the movement path information to the server apparatus 200 (S725, S730).

The server apparatus 200 may generate the random data (S735) and perform the operation in a state of the homomorphic ciphertext along with the movement path information and the comparison target path information (S740). The form of the random data and the operating method have been described above, and therefore the overlapped description will not be repeated. The server apparatus 200 may provide the operation result data to the mobile device 100.

The mobile device 100 may decrypt the operation result data (S745) and detect whether the routes overlap based on the decrypted result value (S750).

The method of FIGS. 6 and 7 may be performed on the mobile device 100 having the configuration illustrated in FIG. 2 and the server apparatus 200 having the configuration illustrated in FIG. 5, but is not limited thereto, and may be performed on other devices having various configurations.

In addition, in the above embodiments, it is described that the notification message is provided, if route overlap is detected, but various methods of notifying the route overlap to a third terminal apparatus may be used.

Meanwhile, the embodiments described above may be implemented in a form of a computer-readable recording medium storing instructions and data executable by the computer. At least one of the instruction and data may be stored in a form of a program code and, when it is executed by the processor, a predetermined program module may be generated to perform a predetermined operation.

Specifically a program code sequentially performing a step of calculating and storing location information, a step of generating movement path information by performing homomorphic encryption of a plurality of stored location information, a step of transmitting the movement path information to a server apparatus, a step of, based on an operation result data obtained by operating based on the movement path information and the comparison target path information being received from the server apparatus, decrypting the operation result data, and a step of outputting a message notifying a route overlap with the comparison target path information based on the decrypted result, may be spread in a state of being stored in the computer-readable recording medium.

The computer-readable recording medium may be mounted on or connected to various apparatuses. In the apparatuses where the recording medium is mounted or connected, program codes recorded on the recording medium may be executed to perform the operations according to the various embodiments.

Such a computer-readable recording medium may be a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk drive, a solid-state drive (SSD), and the like. In addition, any device capable of storing instructions or software, related data, data files, and data structures, and providing instructions or software, related data, data files, and data structures to a processor or a computer so that the processor or the computer executes the instructions may be used.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A mobile device comprising:

a communicator;

a global positioning system (GPS) unit for calculating location information of the mobile device;

a memory;

a display; and a processor configured to obtain a plurality of pieces of location information according to a location change of the mobile device from the GPS unit and store the plurality of pieces of location information in the memory, wherein the processor is further configured to:

generate movement path information of the mobile device by performing homomorphic encryption of the plurality of pieces of location information stored in the memory, and transmit the movement path information to a server apparatus through the communicator;

based on operation result data obtained by operating based on the movement path information and comparison target path information being transmitted from the server apparatus, decrypt the operation result data;

output a message notifying whether a route overlaps the comparison target path information based on a decrypted result through the display; and wherein the processor is further configured to encode the plurality of pieces of location information stored in the memory to each element in a plaintext space of a homomorphic ciphertext, calculate a polynomial configured with each encoded element, and perform homomorphic encryption on the calculated polynomial $f_A(x)$ to generate the movement path information, the polynomial $$f_A(x) \text{ is } f_A(x) = \prod_{i=1}^{n}(x - a_i) \in Z_p[x],$$

and wherein, x represents a variable, $Z_p[x]$ represents the plaintext space, and $a_i$ represents an i-th element in the plaintext space.

2. The mobile device according to claim 1, wherein the processor is further configured to calculate a vector value by encoding the plurality of pieces of location information stored in the memory to each element in a plaintext space of a homomorphic ciphertext, and perform homomorphic encryption on the calculated vector value to generate the encrypted movement path information.

3. The mobile device according to claim 2, wherein the operation result data is ctxt:=$(Enc(\vec{a})-\vec{b})\odot\vec{r}$, wherein, $\vec{r}$ represents a random vector, $\vec{b}$ represents the vector value obtained by encoding the comparison target path information, and $Enc(\vec{a})$ represents the movement path information subjected to the homomorphic encryption, and the processor is further configured to obtain $\vec{ptxt}$ by decrypting the ctxt, based on an i-th element of the $\vec{ptxt}$ being 0, detect that the route overlaps at a point where the mobile device is located at time $t_i$, and based on all elements being not 0, detect that the route does not overlap.

4. The mobile device according to claim 1, wherein the operation result data is $Enc(r_A(x) \cdot f_A(x) + r_B(x) \cdot f_B(x))$, wherein, $r_A(x)$ and $r_B(x)$ represent random polynomials, and $f_B(x)$ represents a polynomial obtained by encoding the comparison target path information, and the processor is further configured to obtain $g(x)=r_A(x) \cdot f_A(x) + r_B(x) \cdot f_B(x)$ by decrypting the operation result data, calculate a greatest common denominator of the operation result data and the $f_A(x)$; based on the greatest common denominator being $$\prod_{i=1}^{n}(x - b_i),$$

detect that the route overlaps at a point where the mobile device is located at time $t_i$ that $b_i$ is decrypted; and based on the greatest common denominator being 1, detect that the route does not overlap.

5. A route overlap detecting method of a mobile device, the method comprising:

calculating and storing location information of the mobile device;

performing homomorphic encryption on a plurality of pieces stored location information and generating movement path information of the mobile device;

transmitting the movement path information to a server apparatus;

based on operation result data obtained by operating based on the movement path information and comparison target path information being received from the server apparatus, decrypting the operation result data;

outputting a message notifying whether a route overlaps the comparison target path information based on a decrypted result; and wherein the generating the movement path information comprises encoding the plurality of pieces of location information to each element in a plaintext space of a homomorphic ciphertext, calculating a polynomial configured with each encoded element, and performing homomorphic encryption on the calculated polynomial f A(x) to generate the movement path information, the polynomial $$f_A(x) \text{ is } f_A(x) = \prod_{i=1}^{n}(x - a_i) \in Z_p[x],$$

and wherein, x represents a variable, $Z_p[x]$ represents the plaintext space, and $a_i$ represents an i-th element in the plaintext space.

6. The route overlap detecting method according to claim 5, wherein the generating the movement path information comprises:

calculating a vector value by encoding the plurality of pieces of location information to each element in a plaintext space of a homomorphic ciphertext; and performing homomorphic encryption on the calculated vector value to generate the movement path information.

7. The route overlap detecting method according to claim 6, wherein the operation result data is ctxt:=$(Enc(\vec{a})-\vec{b})\odot\vec{r}$, wherein, $\vec{r}$ represents a random vector, $\vec{b}$ represents the vector value obtained by encoding the comparison target path information, and $Enc(\vec{a})$ represents the movement path information subjected to the homomorphic encryption, and the outputting the message comprises:

based on an i-th element of the $\vec{ptxt}$ obtained by decrypting the ctxt being 0, detecting that the route overlaps at a point where the mobile device is located at time $t_i$, and based on all elements being not 0, detecting that the route does not overlap; and generating and outputting a message corresponding to a detection result.

8. The route overlap detecting method according to claim 5, wherein the operation result data is $Enc(r_A(x) \cdot f_A(x) + r_B(x) \cdot f_B(x))$, wherein, $r_A(x)$ and $r_B(x)$ represent random polynomials, and $f_B(x)$ represents a polynomial obtained by encoding the comparison target path information, and the outputting the message comprises:

calculating a greatest common denominator of $g(x)=r_A(x) \cdot f_A(x) + r_B(x) \cdot f_B(x)$ obtained by decrypting the operation result data and the $f_A(x)$;

based on the greatest common denominator being $$\prod_{i=1}^{n}(x - b_i),$$

detecting that the route overlaps at a point where the mobile device is located at time $t_i$ that $b_i$ is decrypted, and based on the greatest common denominator being 1, detecting that the route does not overlap; and generating and outputting a message corresponding to a detection result.

9. A non-transitory recording medium storing a program code for performing a route overlap detecting method of a terminal apparatus, the route overlap detecting method comprising:
 calculating and storing location information of the mobile device;
 performing homomorphic encryption on a plurality of pieces stored location information and generating movement path information of the mobile device;
 transmitting the movement path information to a server apparatus;
 based on operation result data obtained by operating based on the movement path information and comparison target path information being received from the server apparatus, decrypting the operation result data;
 outputting a message notifying whether a route overlaps the comparison target path information based on a decrypted result; and
 wherein the generating the movement path information comprises encoding the plurality of pieces of location information to each element in a plaintext space of a homomorphic ciphertext, calculating a polynomial configured with each encoded element, and performing homomorphic encryption on the calculated polynomial $f_A(x)$ to generate the movement path information,
 the polynomial $f_A(x)$ is $f_A(x) = \prod_{i=1}^{n}(x - a_i) \in Z_p[x]$, and
 wherein, x represents a variable, $Z_p[x]$ represents the plaintext space, and $a_i$ represents an i-th element in the plaintext space,
 the operation result data is Enc $(r_A(x) \cdot f_A(x) + r_g(x) \cdot f_B(x))$,
 wherein, $r_A(x)$ and $r_b(x)$ represent random polynomials, and $f_B(x)$ represents a polynomial obtained by encoding the comparison target path information, and the outputting the message comprises:
 calculating a greatest common denominator of $g(x) = r_A(x) \cdot f_{A(x)+rB}(x) \cdot f_B(x)$ obtained by decrypting the operation result data and the $f_A(x)$ based on the greatest common denominator being $\prod_{i=1}^{n}(x - b_i)$, detecting that the route overlaps at a point where the mobile device is located at time $t_i$ that $b_i$ is decrypted, and based on the greatest common denominator being 1, detecting that the route does not overlap; and
 generating and outputting a message corresponding to a detection result.

10. The non-transitory recording medium according to claim 9, wherein the generating the movement path information comprises:
 calculating a vector value by encoding the plurality of pieces of location information to each element in a plaintext space of a homomorphic ciphertext; and
 performing homomorphic encryption on the calculated vector value to generate the movement path information,
 the operation result data is ctxt:=$(\text{Enc}(\vec{a})-\vec{b})\odot\vec{r}$,
 wherein, $\vec{r}$ represents a random vector, $\vec{b}$ represents the vector value obtained by encoding the comparison target path information, and $\text{Enc}(\vec{a})$ represents the movement path information subjected to the homomorphic encryption, and
 the outputting the message comprises:
 based on an i-th element of the $\vec{ptxt}$ obtained by decrypting the ctxt being 0, detecting that the route overlaps at a point where the mobile device is located at time $t_i$, and based on all elements being not 0, detecting that the route does not overlap; and
 generating and outputting a message corresponding to a detection result.

* * * * *